(12) United States Patent
Rumler et al.

(10) Patent No.: US 11,639,805 B2
(45) Date of Patent: May 2, 2023

(54) SYSTEMS AND METHODS FOR OPTIMAL REPRESENTATION OF SETPOINT SELECTION VIA AN ARRAY OF LIGHTS

(71) Applicant: Johnson Controls Technology Company, Auburn Hills, MI (US)

(72) Inventors: Daniel R. Rumler, New Berlin, WI (US); Daniel J. Spacek, Cudahy, WI (US); Kevin C. Luty, West Allis, WI (US); Rex Allen, Milwaukee, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 390 days.

(21) Appl. No.: 16/246,290

(22) Filed: Jan. 11, 2019

(65) Prior Publication Data
US 2020/0224912 A1    Jul. 16, 2020

(51) Int. Cl.
| | | |
|---|---|---|
| *F24F 11/62* | (2018.01) | |
| *F24F 11/523* | (2018.01) | |
| *G06F 3/04883* | (2022.01) | |
| *G06F 3/0482* | (2013.01) | |
| *F24F 11/88* | (2018.01) | |
| *F24F 110/10* | (2018.01) | |

(52) U.S. Cl.
CPC ............ *F24F 11/523* (2018.01); *F24F 11/62* (2018.01); *F24F 11/88* (2018.01); *G06F 3/0482* (2013.01); *G06F 3/04883* (2013.01); *F24F 2110/10* (2018.01)

(58) Field of Classification Search
CPC .......... F24F 11/523; F24F 11/62; F24F 11/88; F24F 2110/10; G06F 3/0482; G06F 4/04883

See application file for complete search history.

(56) References Cited

U.S. PATENT DOCUMENTS

| | | | |
|---|---|---|---|
| D828,816 S | 9/2018 | Spors et al. | |
| 2010/0261465 A1* | 10/2010 | Rhoads | H04M 1/72415 455/420 |
| 2014/0316581 A1* | 10/2014 | Fadell | F24F 11/30 700/276 |
| 2015/0148963 A1* | 5/2015 | Klein | F24F 11/30 700/276 |

(Continued)

FOREIGN PATENT DOCUMENTS

WO    WO 2018/156137    8/2018

*Primary Examiner* — Nael N Babaa
(74) *Attorney, Agent, or Firm* — Foley & Lardner LLP

(57) ABSTRACT

A building device includes a plurality of sensors, a display device, and a control circuit. The display device includes a user interface having a set of indicator lights. The display device further includes a plurality of touch-sensitive buttons configured to receive a user input. The control circuit is configured to receive configuration information relating to a preset setpoint value, a maximum setpoint value, and a minimum setpoint value. The control circuit is further configured to receive a user input relating to a temperature adjustment for increasing a current setpoint value or decreasing the current setpoint value. The control circuit is further configured to configure an output of the set of indicator lights to provide a visual representation of the temperature adjustment by associating the current setpoint value with activation of at least one of the indicator light of the set.

21 Claims, 9 Drawing Sheets

(56) References Cited

U.S. PATENT DOCUMENTS

| | | |
|---|---|---|
| 2016/0313018 A1* | 10/2016 | Leeland .................. F24F 11/62 |
| 2018/0058713 A1 | 3/2018 | Spors |
| 2018/0058941 A1 | 3/2018 | Spors |
| 2018/0119978 A1* | 5/2018 | Becker .................... F24D 19/10 |
| 2018/0306457 A1* | 10/2018 | Byers ...................... G01J 5/025 |

* cited by examiner

SYSTEMS AND METHODS FOR OPTIMAL REPRESENTATION OF SETPOINT SELECTION VIA AN ARRAY OF LIGHTS

BACKGROUND

The present disclosure relates generally to sensor devices or thermostats for heating, ventilation, and air conditioning (HVAC) systems. The present disclosure relates more particularly to user interface of the devices.

A building can include an HVAC system airside system including an air handler unit (AHU), multiple variable air volume units (VAVs) associated with various zones, and a sensor device or thermostat configured to control the AHU and/or the VAVs. The sensor device or thermostat can be configured to regulate the air temperature of the zones by modifying the control of heating and cooling in the zones.

A sensor device or thermostat may include a user interface enabling user interaction. The user interface may include a display to provide feedback to a user in response to a user input. For example, a user interface may indicate a temperature setpoint adjustment in response to a particular user input.

SUMMARY

One implementation of the present disclosure includes a building device. The building device includes a plurality of sensors configured to sense an environmental condition, a display device, and a control circuit. The display device includes a user interface having a set of indicator lights and a plurality of touch-sensitive buttons configured to receive a user input. The control circuit is communicably coupled to the plurality of sensors and the display device. The control circuit is configured to receive configuration information relating to a preset setpoint value, a maximum setpoint value, and a minimum setpoint value. The control circuit is further configured to receive, via the touch-sensitive buttons, a user input relating to a temperature adjustment for increasing a current setpoint value or decreasing the current setpoint value. The control circuit is further configured to configure an output of the set of indicator lights to provide a visual representation of the temperature adjustment, whereby configuring the output of the set of indicator lights to provide a visual representation of the temperature adjustment includes associating the current setpoint value with activation of at least one of the indicator light of the set.

Another implementation of the present disclosure includes a sensor device for use in a room. The sensor device includes a temperature sensor, a humidity sensor, a carbon dioxide sensor, an occupancy sensor, and a display device. The temperature sensor is configured to sense temperature in the room. The humidity sensor is configured to sense humidity in the room. The carbon dioxide sensor is configured to sense the carbon dioxide level in the room. The occupancy sensor is configured to detect the presence of a person in the room. The display device includes a user interface having a set of indicator lights and a plurality of touch-sensitive buttons configured to receive a user input. The display device further includes a control circuit. The control circuit is configured to receive configuration information relating to a preset setpoint value, a maximum setpoint value, and a minimum setpoint value. The control circuit is further configured to receive, via the touch-sensitive buttons, a user input relating to a temperature adjustment for increasing a current setpoint value or decreasing the current setpoint value. The control circuit is further configured to configure an output of the set of indicator lights to provide a visual representation of the temperature adjustment, whereby configuring the output of the set of indicator lights to provide a visual representation of the temperature adjustment includes associating the current setpoint value with activation of at least one of the indicator light of the set.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Referring generally to the FIGURES, systems and methods for configuring an optimal representation of setpoint selection is shown, according to various exemplary embodiments. In a building, various zones may be defined where environmental conditions of each zone are controlled by building equipment located in the zone or otherwise associated with the zone. For example, in the building, an air handler unit (AHU) may heat or cool air for the entire building. In each zone, an HVAC system can regulate the environmental conditions where a thermostat can control the HVAC to heat or cool the zone.

Embodiments described herein may relate to a sensor device configured with a user interface having a set of indicator lights. Each of the indicator lights may be a LED (light-emitting diode) light configured to be selectively operated to provide visual feedback to a user in response to a user input. In some embodiments, the indicator lights may be configured to provide various combinations of colors and/or brightness levels. As described herein, the activation, the brightness level, the color, and other parameters of the set of indicator lights can be configured such that the user interface provides enhanced degree of resolution of a relative setpoint scale (e.g., between a maximum temperature and a minimum temperature). In this manner, the user interface provides feedback to a user in an intuitive manner, simplifying operation of the sensor device.

Building Management System and HVAC System

Figure 1:
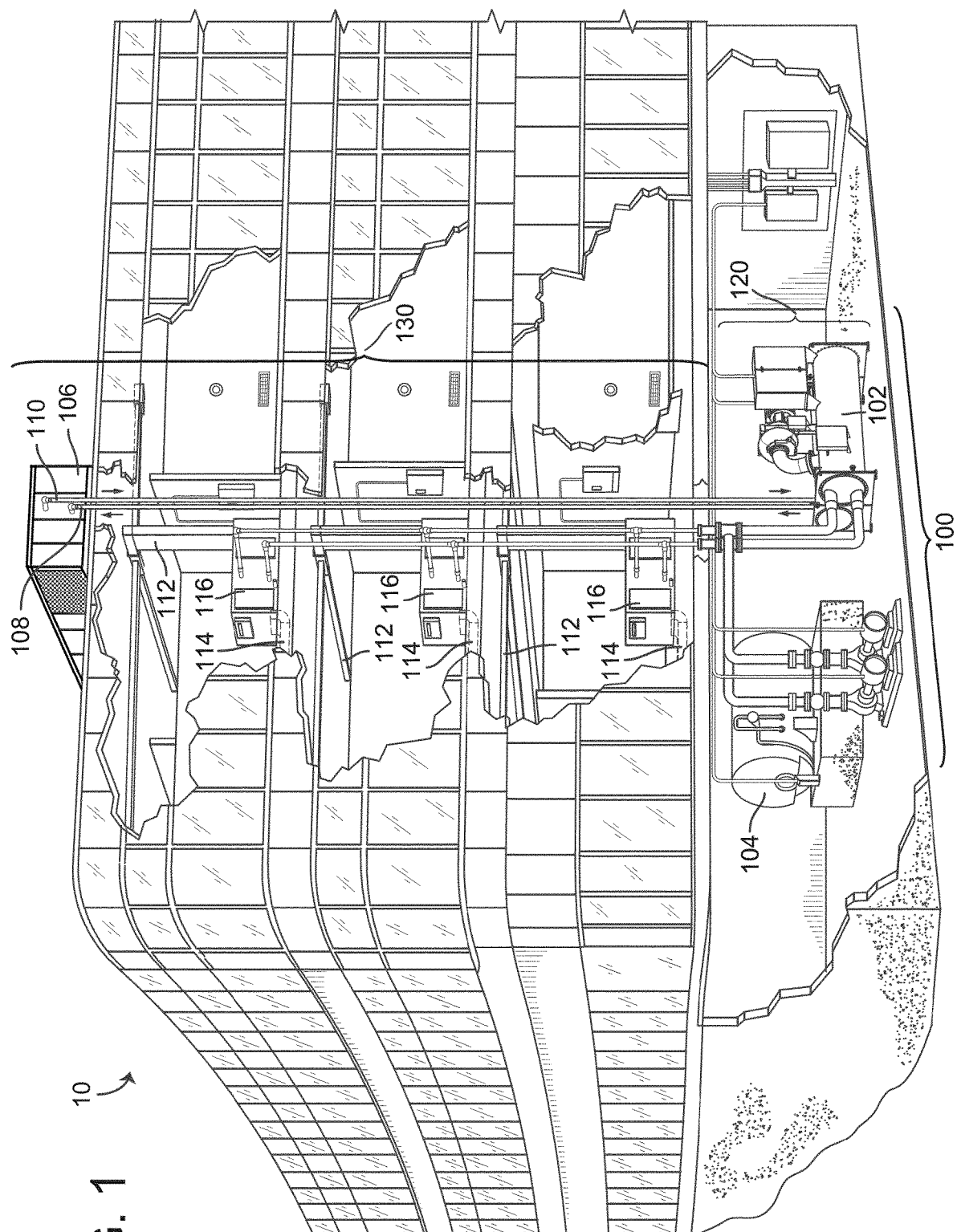
FIG. 1 is a drawing of a building equipped with an HVAC system, according to an exemplary embodiment.
Figure 2:
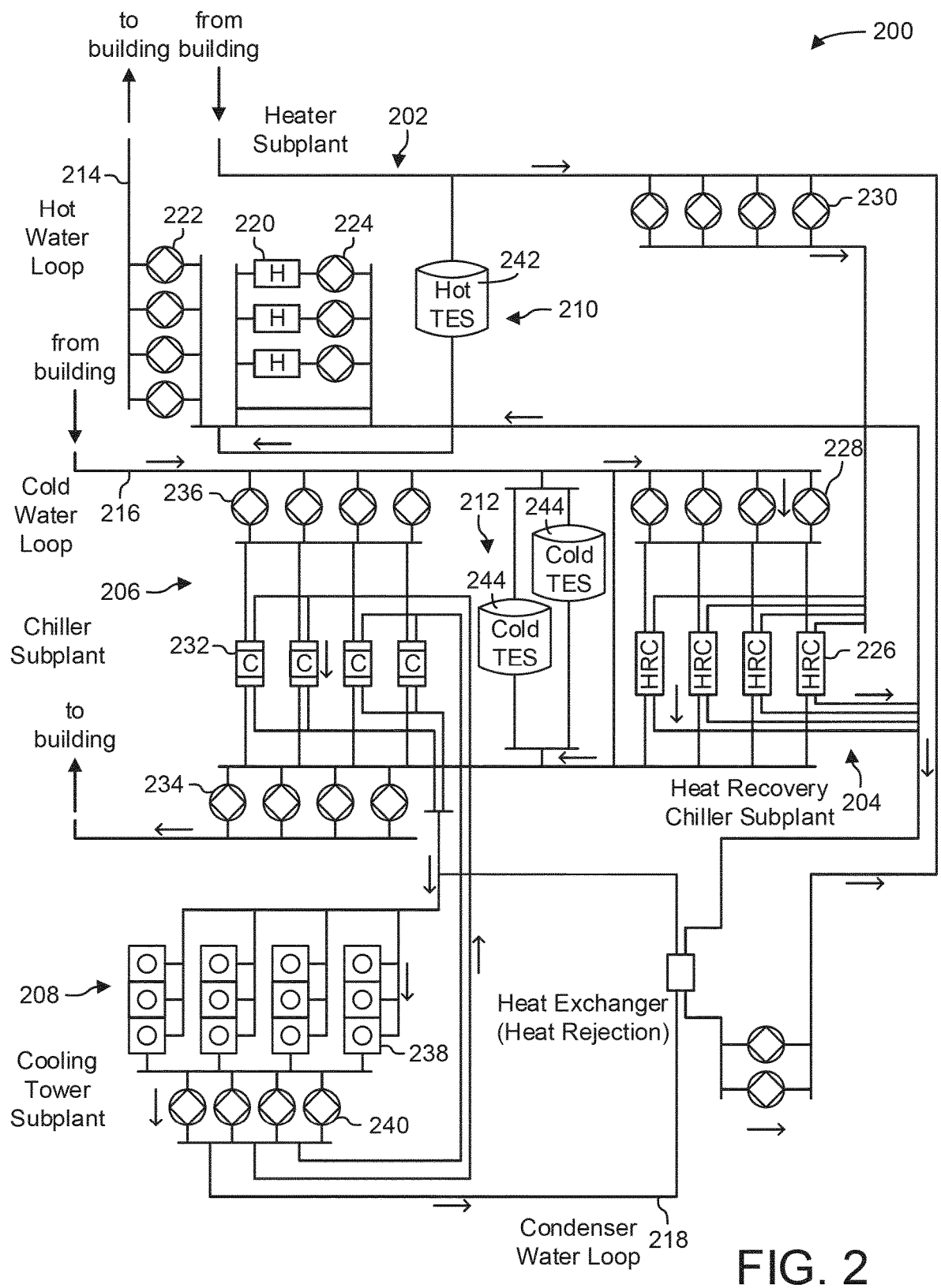
FIG. 2 is a block diagram of a waterside system that may be used in conjunction with the building of FIG. 1, according to an exemplary embodiment.
Figure 3:
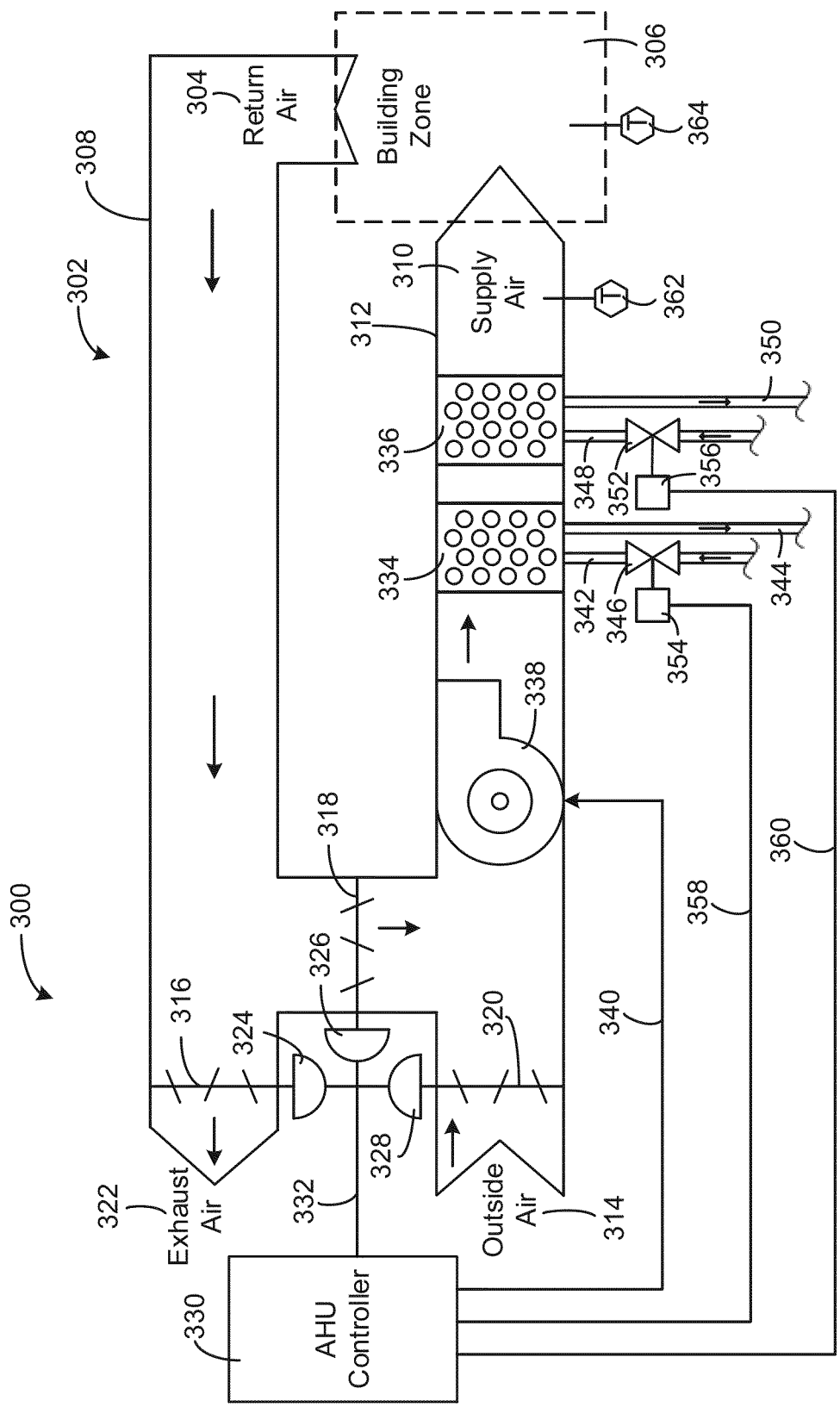
FIG. 3 is a block diagram of an airside system that may be used in conjunction with the building of FIG. 1, according to an exemplary embodiment.

Referring now to FIGS. 1-3, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, set-points, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
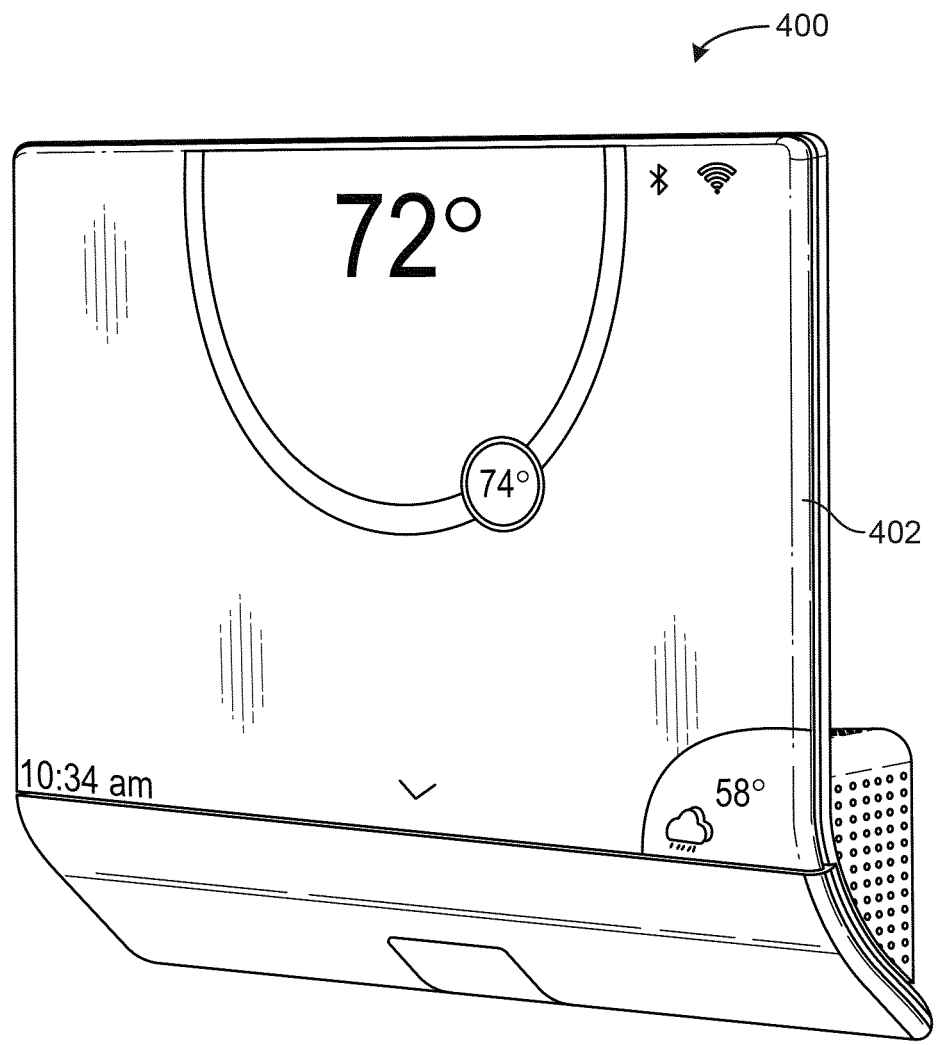
FIG. 4 is a drawing of a cantilevered thermostat with a transparent display that may be used to control the HVAC system of FIG. 1, according to an exemplary embodiment.

Referring now to FIG. 4, a drawing of a thermostat 400 for controlling building equipment is shown, according to an exemplary embodiment. The thermostat 400 is shown to include a display 402. The display 402 may be an interactive display that can display information to a user and receive input from the user. The display may be transparent such that a user can view information on the display and view the surface located behind the display. Thermostats with transparent and cantilevered displays are described in further detail in U.S. patent application Ser. No. 15/146,649 filed May 4, 2016, the entirety of which is incorporated by reference herein.

The display 402 can be a touchscreen or other type of electronic display configured to present information to a user in a visual format (e.g., as text, graphics, etc.) and receive input from a user (e.g., via a touch-sensitive panel). For example, the display 402 may include a touch-sensitive panel layered on top of an electronic visual display. A user can provide inputs through simple or multi-touch gestures by touching the display 402 with one or more fingers and/or with a stylus or pen. The display 402 can use any of a variety of touch-sensing technologies to receive user inputs, such as capacitive sensing (e.g., surface capacitance, projected capacitance, mutual capacitance, self-capacitance, etc.), resistive sensing, surface acoustic wave, infrared grid, infrared acrylic projection, optical imaging, dispersive signal technology, acoustic pulse recognition, or other touch-sensitive technologies known in the art. Many of these technologies allow for multi-touch responsiveness of display 402 allowing registration of touch in two or even more locations at once. The display may use any of a variety of display technologies such as light emitting diode (LED), organic light-emitting diode (OLED), liquid-crystal display (LCD), organic light-emitting transistor (OLET), surface-conduction electron-emitter display (SED), field emission display (FED), digital light processing (DLP), liquid crystal on silicon (LCoC), or any other display technologies known in the art. In some embodiments, the display 402 is configured to present visual media (e.g., text, graphics, etc.) without requiring a backlight.

Residential HVAC System

Figure 5:
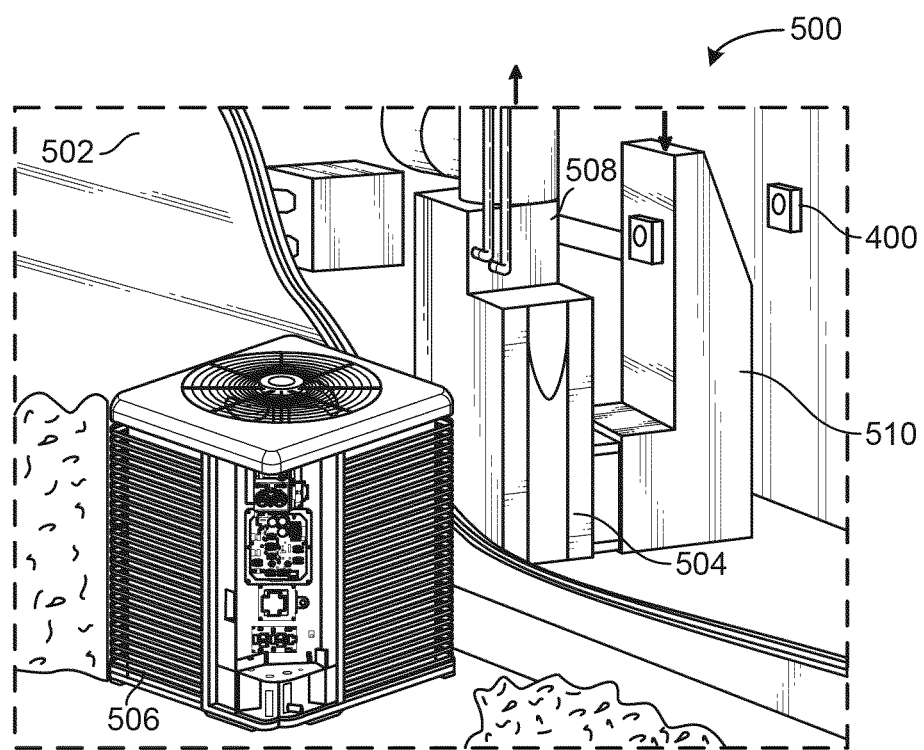
FIG. 5 is a schematic drawing of a building equipped with a residential heating and cooling system and the thermostat of FIG. 4, according to an exemplary embodiment.

Referring now to FIG. 5, a residential heating and cooling system 500 is shown, according to an exemplary embodiment. The residential heating and cooling system 500 may provide heated and cooled air to a residential structure. Although described as a residential heating and cooling system 500, embodiments of the systems and methods described herein can be utilized in a cooling unit or a heating unit in a variety of applications include commercial HVAC units (e.g., roof top units). In general, a residence 502 includes refrigerant conduits that operatively couple an indoor unit 504 to an outdoor unit 506. Indoor unit 504 may be positioned in a utility space, an attic, a basement, and so forth. Outdoor unit 506 is situated adjacent to a side of residence 502. Refrigerant conduits transfer refrigerant between indoor unit 504 and outdoor unit 506, typically transferring primarily liquid refrigerant in one direction and primarily vaporized refrigerant in an opposite direction.

When the system 500 shown in FIG. 5 is operating as an air conditioner, a coil in outdoor unit 506 serves as a condenser for recondensing vaporized refrigerant flowing from indoor unit 504 to outdoor unit 506 via one of the refrigerant conduits. In these applications, a coil of the indoor unit 504, designated by the reference numeral 508, serves as an evaporator coil. Evaporator coil 508 receives liquid refrigerant (which may be expanded by an expansion device, not shown) and evaporates the refrigerant before returning it to outdoor unit 506.

Outdoor unit 506 draws in environmental air through its sides, forces the air through the outer unit coil using a fan, and expels the air. When operating as an air conditioner, the air is heated by the condenser coil within the outdoor unit 506 and exits the top of the unit at a temperature higher than it entered the sides. Air is blown over indoor coil 508 and is then circulated through residence 502 by means of ductwork 510, as indicated by the arrows entering and exiting ductwork 510. The overall system 500 operates to maintain a desired temperature as set by thermostat 400. When the temperature sensed inside the residence 502 is higher than the set point on the thermostat 400 (with the addition of a relatively small tolerance), the air conditioner will become operative to refrigerate additional air for circulation through the residence 502. When the temperature reaches the set point (with the removal of a relatively small tolerance), the unit can stop the refrigeration cycle temporarily.

In some embodiments, the system 500 configured so that the outdoor unit 506 is controlled to achieve a more elegant control over temperature and humidity within the residence 502. The outdoor unit 506 is controlled to operate components within the outdoor unit 506, and the system 500, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

Figure 6:
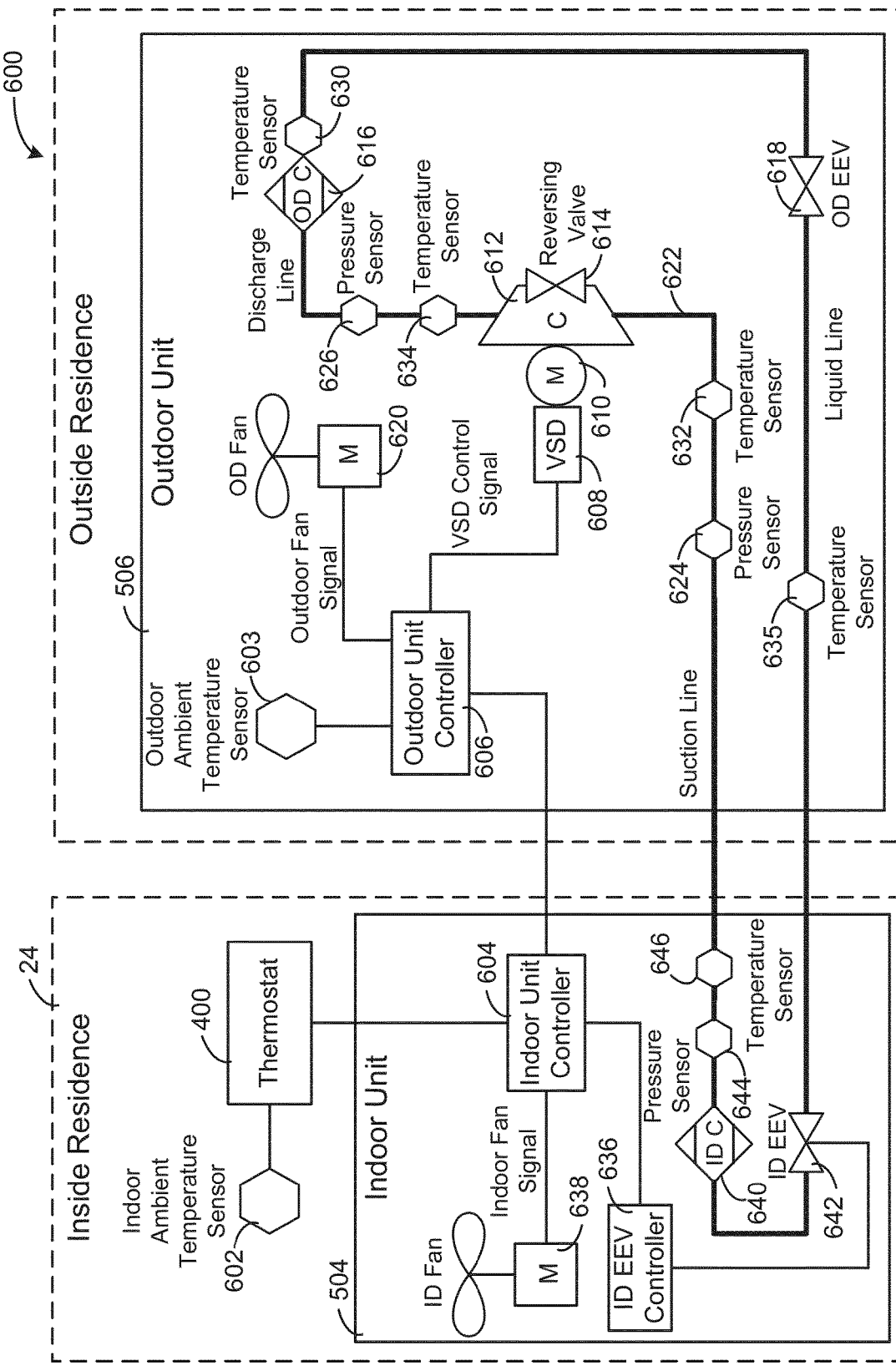
FIG. 6 is a schematic drawing of the thermostat and the residential heating and cooling system of FIG. 4, according to an exemplary embodiment.
Figure 8:
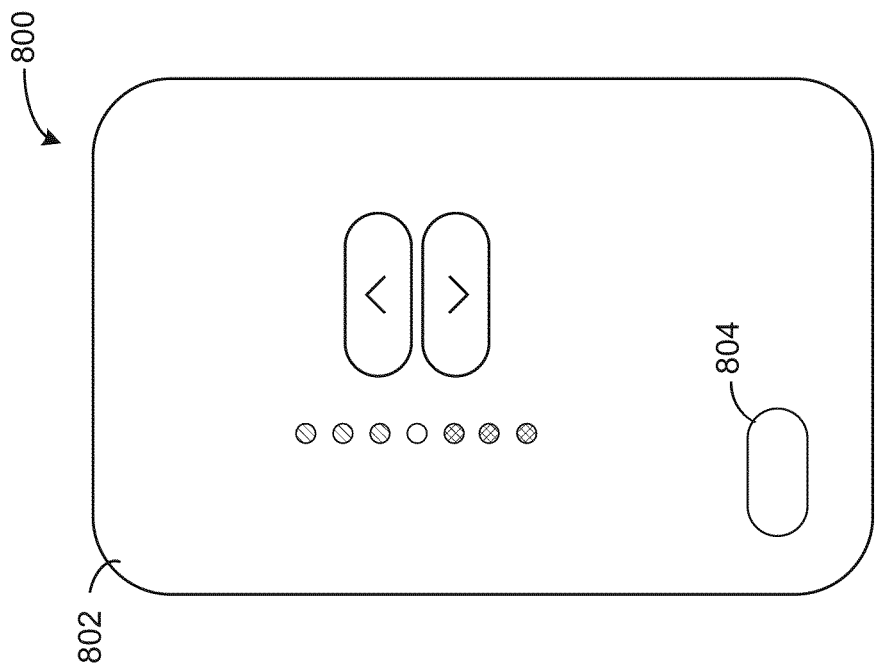
FIG. 8 is another schematic drawing of a building device configured for optimal representation of setpoint selection, according to an exemplary embodiment.

Referring now to FIG. 6, an HVAC system 600 is shown according to an exemplary embodiment. Various components of system 600 are located inside residence 502 while other components are located outside residence 502. Outdoor unit 506, as described with reference to FIG. 5, is shown to be located outside residence 502 while indoor unit 504 and thermostat 400, as described with reference to FIG. 6, are shown to be located inside the residence 502. In various embodiments, the thermostat 400 can cause the indoor unit 504 and the outdoor unit 506 to heat residence 502. In some embodiments, the thermostat 400 can cause the indoor unit 504 and the outdoor unit 506 to cool the residence 502. In other embodiments, the thermostat 400 can command an airflow change within the residence 502 to adjust the humidity within the residence 502.

Thermostat 400 can be configured to generate control signals for indoor unit 504 and/or outdoor unit 506. The thermostat 400 is shown to be connected to an indoor ambient temperature sensor 602, and an outdoor unit controller 606 is shown to be connected to an outdoor ambient temperature sensor 603. The indoor ambient temperature sensor 602 and the outdoor ambient temperature sensor 603 may be any kind of temperature sensor (e.g., thermistor, thermocouple, etc.). The thermostat 400 may measure the temperature of residence 502 via the indoor ambient temperature sensor 602. Further, the thermostat 400 can be configured to receive the temperature outside residence 502 via communication with the outdoor unit controller 606. In various embodiments, the thermostat 400 generates control signals for the indoor unit 504 and the outdoor unit 506 based on the indoor ambient temperature (e.g., measured via indoor ambient temperature sensor 602), the outdoor temperature (e.g., measured via the outdoor ambient temperature sensor 603), and/or a temperature set point.

The indoor unit 504 and the outdoor unit 506 may be electrically connected. Further, indoor unit 504 and outdoor unit 506 may be coupled via conduits 622. The outdoor unit 506 can be configured to compress refrigerant inside conduits 622 to either heat or cool the building based on the operating mode of the indoor unit 504 and the outdoor unit 506 (e.g., heat pump operation or air conditioning operation). The refrigerant inside conduits 622 may be any fluid that absorbs and extracts heat. For example, the refrigerant may be hydro fluorocarbon (HFC) based R-410A, R-407C, and/or R-134a.

The outdoor unit 506 is shown to include the outdoor unit controller 606, a variable speed drive 608, a motor 610 and a compressor 612. The outdoor unit 506 can be configured to control the compressor 612 and to further cause the compressor 612 to compress the refrigerant inside conduits 622. In this regard, the compressor 612 may be driven by the variable speed drive 608 and the motor 610. For example, the outdoor unit controller 606 can generate control signals for the variable speed drive 608. The variable speed drive 608 (e.g., an inverter, a variable frequency drive, etc.) may be an AC-AC inverter, a DC-AC inverter, and/or any other type of inverter. The variable speed drive 608 can be configured to vary the torque and/or speed of the motor 610 which in turn drives the speed and/or torque of compressor 612. The compressor 612 may be any suitable compressor such as a screw compressor, a reciprocating compressor, a rotary compressor, a swing link compressor, a scroll compressor, or a turbine compressor, etc.

In some embodiments, the outdoor unit controller 606 is configured to process data received from the thermostat 400 to determine operating values for components of the system 600, such as the compressor 612. In one embodiment, the outdoor unit controller 606 is configured to provide the determined operating values for the compressor 612 to the variable speed drive 608, which controls a speed of the compressor 612. The outdoor unit controller 606 is controlled to operate components within the outdoor unit 506, and the indoor unit 504, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

In some embodiments, the outdoor unit controller 606 can control a reversing valve 614 to operate system 600 as a heat pump or an air conditioner. For example, the outdoor unit controller 606 may cause reversing valve 614 to direct compressed refrigerant to the indoor coil 508 while in heat pump mode and to an outdoor coil 616 while in air conditioner mode. In this regard, the indoor coil 508 and the outdoor coil 616 can both act as condensers and evaporators depending on the operating mode (i.e., heat pump or air conditioner) of system 600.

Further, in various embodiments, outdoor unit controller 606 can be configured to control and/or receive data from an outdoor electronic expansion valve (EEV) 518. The outdoor electronic expansion valve 518 may be an expansion valve controlled by a stepper motor. In this regard, the outdoor unit controller 606 can be configured to generate a step signal (e.g., a PWM signal) for the outdoor electronic expansion valve 518. Based on the step signal, the outdoor electronic expansion valve 518 can be held fully open, fully closed, partial open, etc. In various embodiments, the outdoor unit controller 606 can be configured to generate step signal for the outdoor electronic expansion valve 518 based on a subcool and/or superheat value calculated from various temperatures and pressures measured in system 600. In one embodiment, the outdoor unit controller 606 is configured to control the position of the outdoor electronic expansion valve 518 based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The outdoor unit controller 606 can be configured to control and/or power outdoor fan 620. The outdoor fan 620 can be configured to blow air over the outdoor coil 616. In this regard, the outdoor unit controller 606 can control the amount of air blowing over the outdoor coil 616 by generating control signals to control the speed and/or torque of outdoor fan 620. In some embodiments, the control signals are pulse wave modulated signals (PWM), analog voltage signals (i.e., varying the amplitude of a DC or AC signal), and/or any other type of signal. In one embodiment, the outdoor unit controller 606 can control an operating value of the outdoor fan 620, such as speed, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The outdoor unit 506 may include one or more temperature sensors and one or more pressure sensors. The temperature sensors and pressure sensors may be electrical connected (i.e., via wires, via wireless communication, etc.) to the outdoor unit controller 606. In this regard, the outdoor unit controller 606 can be configured to measure and store the temperatures and pressures of the refrigerant at various locations of the conduits 622. The pressure sensors may be any kind of transducer that can be configured to sense the pressure of the refrigerant in the conduits 622. The outdoor unit 506 is shown to include pressure sensor 624. The pressure sensor 624 may measure the pressure of the refrigerant in conduit 622 in the suction line (i.e., a predefined distance from the inlet of compressor 612). Further, the outdoor unit 506 is shown to include pressure sensor 626. The pressure sensor 626 may be configured to measure the pressure of the refrigerant in conduits 622 on the discharge line (e.g., a predefined distance from the outlet of compressor 612).

The temperature sensors of outdoor unit 506 may include thermistors, thermocouples, and/or any other temperature sensing device. The outdoor unit 506 is shown to include temperature sensor 630, temperature sensor 632, temperature sensor 634, and temperature sensor 636. The temperature sensors (i.e., temperature sensor 630, temperature sensor 632, temperature sensor 635, and/or temperature sensor 646) can be configured to measure the temperature of the refrigerant at various locations inside conduits 622.

Referring now to the indoor unit 504, the indoor unit 504 is shown to include indoor unit controller 604, indoor electronic expansion valve controller 636, an indoor fan 638, an indoor coil 640, an indoor electronic expansion valve 642, a pressure sensor 644, and a temperature sensor 646. The indoor unit controller 604 can be configured to generate control signals for indoor electronic expansion valve controller 642. The signals may be set points (e.g., temperature set point, pressure set point, superheat set point, subcool set point, step value set point, etc.). In this regard, indoor electronic expansion valve controller 636 can be configured to generate control signals for indoor electronic expansion valve 642. In various embodiments, indoor electronic expansion valve 642 may be the same type of valve as outdoor electronic expansion valve 618. In this regard, indoor electronic expansion valve controller 636 can be configured to generate a step control signal (e.g., a PWM wave) for controlling the stepper motor of the indoor electronic expansion valve 642. In this regard, indoor electronic expansion valve controller 636 can be configured to fully open, fully close, or partially close the indoor electronic expansion valve 642 based on the step signal.

Indoor unit controller 604 can be configured to control indoor fan 638. The indoor fan 638 can be configured to blow air over indoor coil 640. In this regard, the indoor unit controller 604 can control the amount of air blowing over the indoor coil 640 by generating control signals to control the speed and/or torque of the indoor fan 638. In some embodiments, the control signals are pulse wave modulated signals (PWM), analog voltage signals (i.e., varying the amplitude of a DC or AC signal), and/or any other type of signal. In one embodiment, the indoor unit controller 604 may receive a signal from the outdoor unit controller indicating one or more operating values, such as speed for the indoor fan 638. In one embodiment, the operating value associated with the indoor fan 638 is an airflow, such as cubic feet per minute (CFM). In one embodiment, the outdoor unit controller 606 may determine the operating value of the indoor fan based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The indoor unit controller 604 may be electrically connected (e.g., wired connection, wireless connection, etc.) to pressure sensor 644 and/or temperature sensor 646. In this regard, the indoor unit controller 604 can take pressure and/or temperature sensing measurements via pressure sensor 644 and/or temperature sensor 646. In one embodiment, pressure sensor 644 and temperature sensor 646 are located on the suction line (i.e., a predefined distance from indoor coil 640). In other embodiments, the pressure sensor 644 and/or the temperature sensor 646 may be located on the liquid line (i.e., a predefined distance from indoor coil 640).

Sensor Device Configured for Optimal Representation of Setpoint Selection

Figure 7:
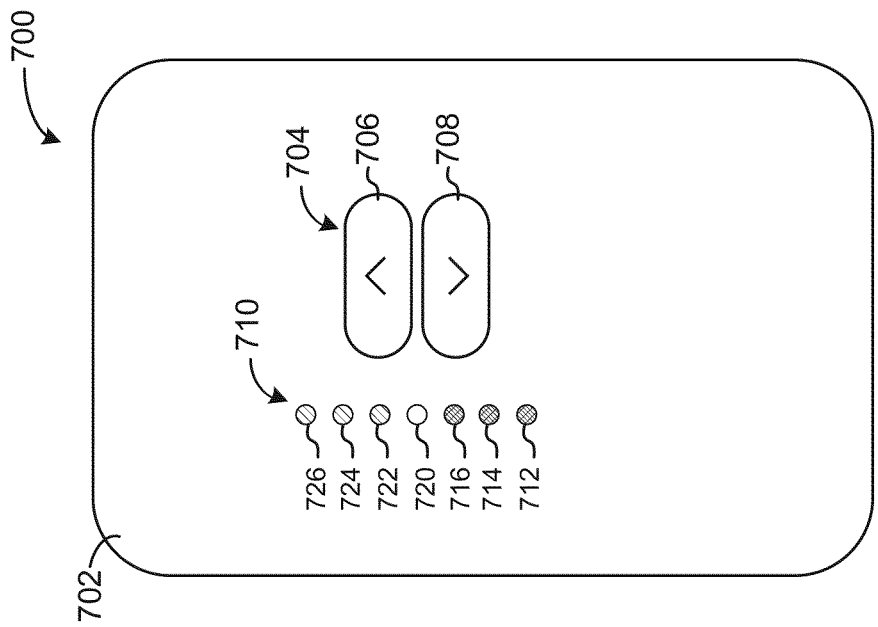
FIG. 7 is a schematic drawing of a building device configured for optimal representation of setpoint selection, according to an exemplary embodiment.

Referring now to FIG. 7, a sensor device 700 is shown according to some embodiments. In some embodiments, the sensor device 700 is a thermostat as described herein. In other embodiments, the sensor device 700 may be any building device, which may or may not include an environmental sensor or occupancy sensor.

The sensor device 700 is shown to include a user interface 702, which includes a plurality of buttons 704 and a set of indicator lights 710. Each of the indicator lights 710 may be an LED (light-emitting diode) light. Although seven indicator lights are provided in the set 710, any number of lights may be provided in various embodiments. In some embodiments, each of the indicator lights 710 is configured to output multiple levels of brightness (e.g., via pulse-width modulation). In some embodiments, when a temperature setpoint of the sensor device 700 is set to a default value, each of the indicator lights 710 is deactivated (i.e., not illuminating light). In some embodiments, the indicator lights 710 may be deactivated when the sensor device 700 is in a resting state (e.g., when no user input after a predetermined period of time).

Each of the indicator lights 710 is configured to be selectively operated, according to some embodiments described herein. In this regard, the indicator lights 710 can be configured to provide visual feedback to a user by activating or deactivating the light. For example, the indicator lights can be configured to provide visual feedback in response to a user input received via one of the buttons 704. In one example embodiment, each of the indicator lights 710 is deactivated and the current temperature setpoint is set to the default value. The indicator light 722 may be selectively activated (i.e., illuminating light) in response to a user pushing the button 706.

In some embodiments, the indicator lights 710 may be configured to provide various combinations of brightness levels and/or colors. Referring to the above example, in response to the user pushing the button 706 a second time, the indicator light 722 may increase brightness or the light 724 may become activated. As described herein, the activation, the brightness level, the color, and other parameters of the set of indicator lights 710 can be configured such that the user interface 702 provides enhanced degree of resolution on a relative setpoint scale (e.g., between a maximum temperature and a minimum temperature. In this manner, the user interface 702 provides feedback to a user in an intuitive manner, for example reducing the number of individual lights for the same level of resolution.

One or more subsets of the indicator lights 710 may correspond to particular functions or features in some embodiments. For example, the indicator light 720 may be configured to provide a white light to visually indicate selection of the default temperature setpoint (e.g., the midpoint between the minimum and maximum temperatures). Additionally or alternatively, the indicator light 720 may be configured to provide a received signal strength indication (RSSI). The RSSI may relate to an ability to wirelessly communicate with another device. For example, the indicator light 720 may provide an RSSI by blinking between once to indicate minimal signal strength and blinking a predetermined number (e.g., three blinks) to indicate an optimal signal strength. In this regard, the number of blinks may be commensurate with a signal strength. In some embodiments, the indicator light 720 is configured to provide an indication of an occupancy of a room (e.g., based on an input received from an occupancy sensor). For example, when a room is occupied, the indicator light 720 may be activated and continuously display a solid white light, and when the room is not occupied, the indicator light 720 may be deactivated. In some embodiments, the indicator light 720 is activated when a room is occupied and the building device is idle (i.e., no user input after a predetermined time period).

The sensor device 700 may be configured with various electrical and other components on or within an enclosure of the sensor device 700 to facilitate operation of features described herein. For example, the sensor device 700 may include a control circuit (e.g., circuit card assemblies) communicably and/or operatively coupled to other components of the sensor device. For example, the sensor device 700 may include any number of input devices (e.g., actuators, buttons, sensors etc.) configured to receive input information. The sensor device 700 may be configured with any number of output devices (e.g., LED's, a display screen, etc.) configured to present visual media (LED light, text, graphics, etc.). In this regard, the control circuit may be configured to receive input information from the input devices and provide visual feedback to a user in response to the input information as described herein.

In some embodiments, the sensor device 700 includes a memory. The memory may be configured to store user input, sensor data, and any other information. In some embodiments, the memory is configured to store configuration information relating to predetermined maximum setpoint, minimum setpoint, and/or default setpoint values. The memory may be provided as a component of the control circuit or as an external component. In some embodiments, the sensor device 700 is communicably and/or operatively coupled to an external device, such as an HVAC device, a building controller, and the like. Communication to external devices may be correspond to any suitable wired or wireless interface.

In some embodiments, one or more portions of the user interface 702 may be provided as a touch-sensitive display or other type of electronic display configured to present information to a user in a visual format (e.g., as text, graphics, etc.). For example, one or more portions of the user interface 702 may be configured with a display screen configured to present information. The display screen may be configured with light emitting diode (LED), organic light-emitting diode (OLED), liquid-crystal display (LCD), organic light-emitting transistor (OLET), surface-conduction electron-emitter display (SED), field emission display (FED), digital light processing (DLP), liquid crystal on silicon (LCoC), and/or any other suitable display technology. In some embodiments, one or more portions of the enclosure includes a transparent faceplate flush against a display screen, enabling visual media to be presented to the user. In some embodiments, a display screen may replace and simulate the indicator lights 710 in some implementations.

In some embodiments, one or more portions of the user interface 702 is configured to receive input from a user. For example, the buttons 704 may be provided as touch-sensitive buttons configured to detect touch and other gestures of a user. In this regard, the user interface 702 may be configured with a touch-sensitive panel layered on top of an electronic visual display. A user can provide inputs through simple or multi-touch gestures by touching the user interface 702 with one or more fingers and/or with a stylus or pen. The user interface 702 may use any of a variety of touch-sensing technologies configured to receive a user input, such as capacitive sensing (e.g., surface capacitance, projected capacitance, mutual capacitance, self-capacitance, etc.), resistive sensing, surface acoustic wave, infrared grid, infrared acrylic projection, optical imaging, dispersive signal technology, acoustic pulse recognition, and/or any other suitable touch-sensitive technology. Each of the buttons 704 may be any suitable size or shape. In some embodiments, one or more of the buttons 704 are provided as physical buttons.

Figure 11:
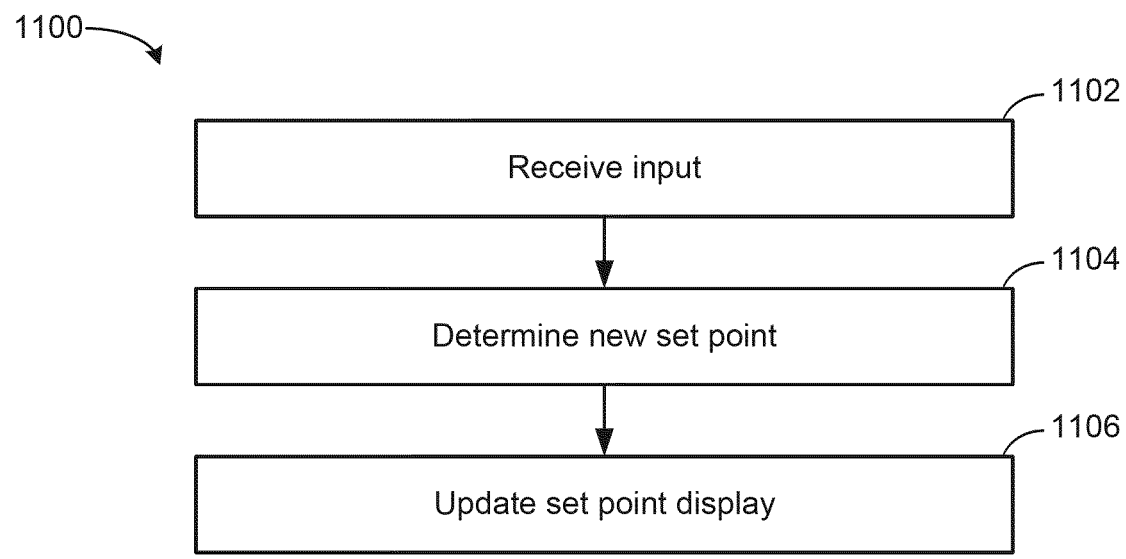
FIG. 11 is another flow diagram of a process for configuring the interface of FIG. 7 for optimal representation of setpoint selection, according to an exemplary embodiment.

In some embodiments, the sensor device 700 is configured with a plurality of sensor devices. For example, embodiments of the sensor device 700 may be configured with one or more of a temperature sensor, a humidity sensor, an occupancy sensor, and/or a $CO_2$ sensor. In this manner, the sensor device 700 may reduce the necessity of providing additional sensor devices in a building space. A sensor device 800 having an occupancy sensor 804 is shown in FIG. 11. The sensor device 800 and the user interface 802 may be configured as described herein with reference to the sensor device 700 and the user interface 702, respectively. The user interface 802 is shown to include an occupancy sensor 804. The occupancy sensor 804 may be configured to measure the occupancy of a space in which sensor device 800 is located. In some embodiments, the occupancy sensor 804 is configured behind a "window" of the user interface 802, allowing light to pass through to the occupancy sensor 804 to facilitate proper function of the occupancy sensor 804.

Figure 9:
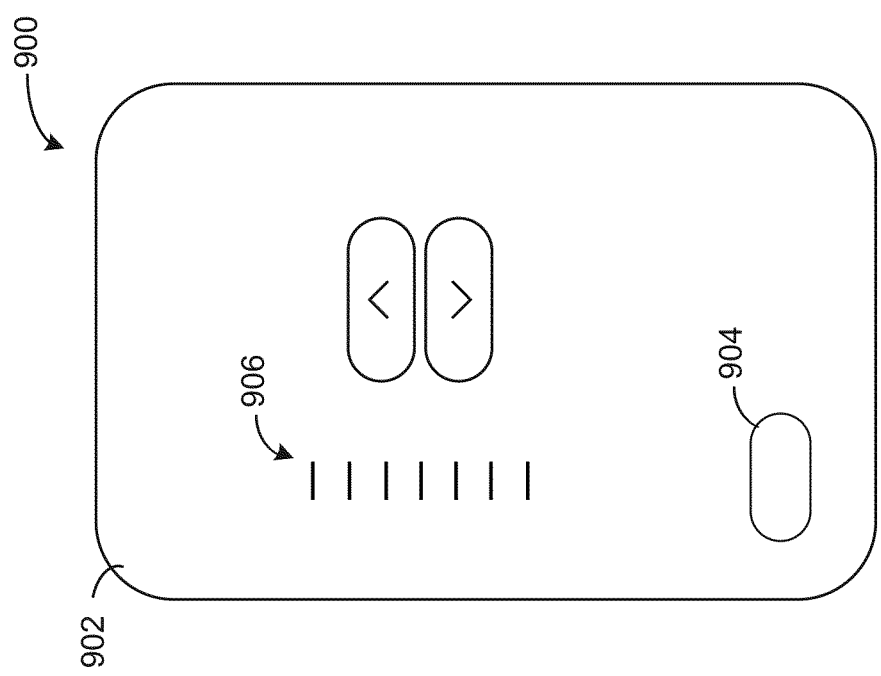
FIG. 9 is another schematic drawing of a building device configured for optimal representation of setpoint selection, according to an exemplary embodiment.

It should be understood that the size, shape, and placement of the user interface 702 and portions therein may be configured in any suitable manner. For example, referring to FIG. 9 a sensor device 900 is shown according to some embodiments. The sensor device 900 includes a user interface 902 having a plurality of indicator lights 906, each having a rectangular shape. In some embodiments, each of the indicator lights 906 is provided via a light guide. Each of the indicator lights 906 and/or other portions of the sensor device 900 may be configured as described with reference to the sensor device 700 and/or the sensor device 800. For example, the sensor device 900 is shown to include an occupancy sensor 904, which may be configured as described with reference to the occupancy sensor 804. In other embodiments of the sensor device 900, the occupancy sensor 904 is not provided.

Figure 10:
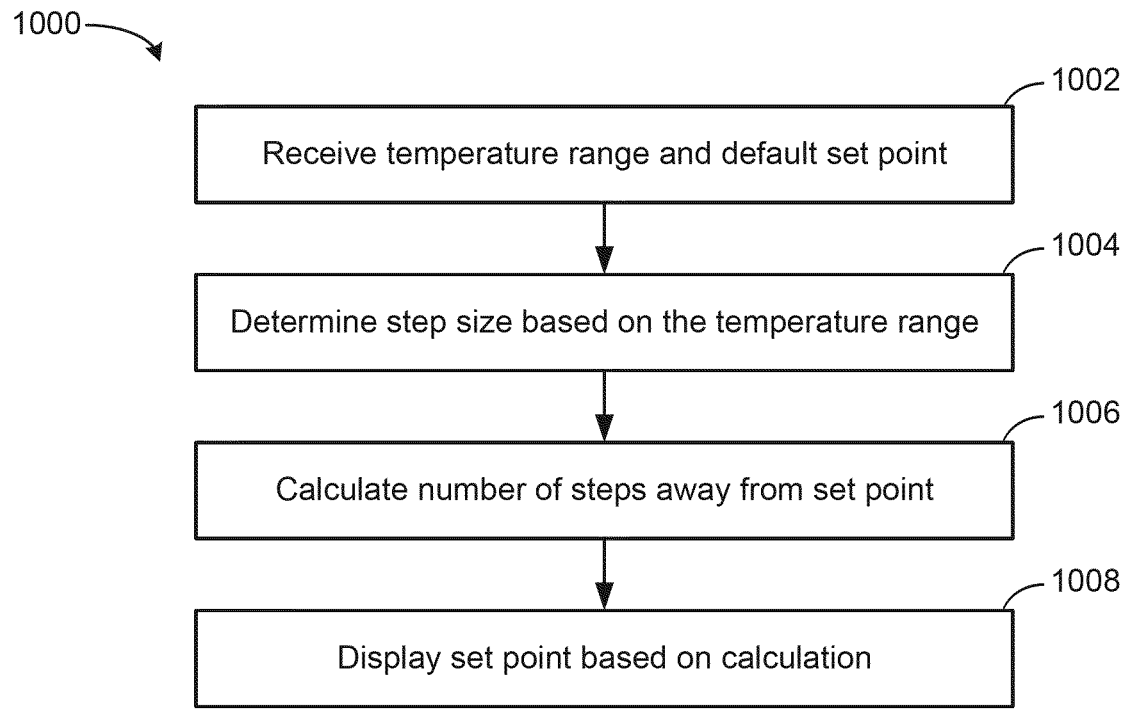
FIG. 10 is a flow diagram of a process for configuring the interface of FIG. 7 for optimal representation of setpoint selection, according to an exemplary embodiment.

Referring now to FIG. 10, a process 1000 for optimal representation of setpoint selection is shown according to some embodiments. In some embodiments, the process 1000 is performed by a building device configured to control a temperature setpoint of a building space. For example, one or more steps of the process may be performed by a control circuit of the sensor device 700.

At step 1002, a temperature range and default setpoint values are received. In some embodiments, the temperature range and default setpoint values are stored in a memory of the control circuit. In some embodiments, the temperature range is defined by a maximum temperature value and a minimum temperature value. In an example embodiment, the maximum temperature value is 79° and the minimum temperature value is 61°. In this example, the temperature range is 18° (the difference between 79° and 61°).

In some embodiments, the maximum temperature value corresponds to a maximum temperature setting that may be set by via a user interface (e.g., the user interface 702), and the minimum temperature value corresponds to a minimum temperature setting that may be set via the user interface. In some embodiments, the default setpoint is a preset temperature value of the building space. In some embodiments, the default setpoint corresponds to a midpoint between the maximum temperature value and the minimum temperature value. Referring to the above example, the default setpoint may be set as 70° (the midpoint between 79° and 61°).

At step 1004, a step size is determined based on the temperature range. In some embodiments, each step size (e.g., an interval of temperatures) may be determined based on permutations of output settings providing a visual indication of a temperature setpoint and/or adjustment. An output setting of each indicator light may relate to its activation, a brightness level, a color, and the like.

Referring to the above example embodiment, a building device may be provided with a set of six indicator lights that may be either on (activated) or off (deactivated) as illustrated by the user interface 702 of FIG. 7. In this example, a temperature selection above the default setpoint causes one of the indicator lights 722, 724, or 726 to be activated. For example, one step above the default setpoint may be associated with indicator light 722 being activated and indicator lights 724, 726 being deactivated. A second step above the default setpoint may be associated with indicator light 724 being activated and indicator lights 722, 726 being deactivated. A third step above the default setpoint may be associated with may be associated with indicator light 726 being activated and indicator lights 722, 724 being deactivated. Similarly, a temperature selection below the default setpoint causes one of the indicator lights 712, 714, or 716 to be activated. In this manner, a visual representation of a temperature adjustment is displayed to a user.

It should be understood that any algorithm may be used to determine a step size. In some embodiments, each of the indicator lights 710 may be selectively configured according to one of a plurality brightness settings. In this regard, the number of steps may be equal to the number of indicator lights 710 multiplied by the number of brightness settings. Referring to the above example embodiment, each of the indicator lights 710 may be configured to selectively provide a low and high brightness. In this regard, twelve steps may be determined. For example, a first step above the default setpoint may be associated with the indicator light 722 being activated at a low brightness. A second step may be associated with a brightness of the indicator light 722 being increased to high brightness. A third step may be associated with indicator light 722 being deactivated and the indicator light 724 being activated at a low brightness.

In some embodiments, step 1004 also involves mapping each step to an interval of temperatures in the temperature range. Referring to the above example in which a temperature range is 18° and six steps are provided, each step may correspond to a 3° interval. For example, when a default setpoint is 70°, three steps may be provided above the default setpoint and three steps may be provided below the default setpoint. In this regard, a first step above the default setpoint may correspond to a temperature setpoint of 73°, a second step may correspond to 76°, and a third step may correspond to 79°. Accordingly, in response to a user input indicating a temperature adjustment to the first step, the control circuit may be configured to activate the indicator light 722 as described above, and operate an HVAC device to increase a temperature setpoint to 73°.

At step 1006, the number of steps away from a set point is calculated. In some embodiments, the number of steps is determined based on a received user input, such as a number of instances a button (e.g., one of the touch-sensitive buttons 704) is selected. The number of steps may vary according to an algorithm and/or components of the sensor device (e.g., the number of indicator lights, brightness settings, etc.). For example, each instance a touch-sensitive button is selected may correspond to one step. In other embodiments, two or more instances of a touch-sensitive button being selected corresponds to one step. Alternatively, one instance of a touch-sensitive button being selected may correspond to multiple steps.

At step 1008, a visual representation of the setpoint is displayed based on the calculation. In some embodiments, the set of indicator lights includes a first subset of indicator lights (e.g., the indicator lights 722, 724, 726) and a second subset of indicator lights (e.g., the indicator lights 712, 714, 716). The first subset of indicator lights is vertically oriented and positioned above a mid-point indicator light (e.g., the indicator light 720), and the second subset of indicator lights is vertically oriented and positioned below the mid-point light. In other embodiments, the indicator lights are provided at different orientations (e.g., horizontal or diagonal orientations) and the first subset of indicator lights is located on one side of the mid-point indicator light and the second subset of indicator lights is located on the other (i.e., opposite) side of the mid-point indicator light. When a temperature selection corresponds to a step above the mid-point, one or more indicator lights of the first set is activated and/or a brightness is increased as described herein. Similarly, when a temperature selection corresponds to a step below the midpoint, one or more indicator lights of the second set is activated and/or a brightness is increased. In some embodiments, when a temperature selection corresponds to a maximum setpoint, each of the first set of indicator lights is activated, and when a temperature selection corresponds to a minimum setpoint, each of the second set of indicator lights is activated.

In some embodiments, one or more of the first subset may be configured to provide a different color output relative to the second subset. For example, each of the indicator lights 722, 724, 726 may be a red color to visually indicate selection of warmer temperature setpoints, and each of the indicator lights 712, 714, 716 may be a blue color to visually indicate selection of cooler temperature setpoints. In this embodiment, the indicator light 720 may be configured to provide a white light to visually indicate selection of the default temperature setpoint (e.g., the mid-point between the minimum and maximum temperatures). Additionally or alternatively, the indicator light 720 may be configured to provide a received signal strength indication (RSSI). The RSSI may relate to an ability to wirelessly communicate with another device. For example, the indicator light 720 may provide an RSSI by blinking between once to indicate minimal signal strength and blinking a predetermined number (e.g., three blinks) to indicate an optimal signal strength. In this regard, the number of blinks may be commensurate with a signal strength. In some embodiments, the indicator light 720 is configured to provide an indication of an occupancy of a room (e.g., based on an input received from an occupancy sensor). For example, when a room is occupied, the indicator light 720 may be activated and continuously display a solid white light, and when the room is not occupied, the indicator light 720 may be deactivated. In some embodiments, the indicator light 720 is activated when a room is occupied and the building device is idle (i.e., no user input after a predetermined time period).

In some embodiments of the process 1000, each of the indicator lights remains activated and/or deactivated until a predetermined event. For example, a predetermined event may relate to a user input, such as a user pressing one of the buttons 704. In this example, an output of each of the indicator lights may change based on the user input (e.g., activating a second light in response to a second temperature increase). In some embodiments, the predetermined event may relate to an indication that a building space is no longer occupied (e.g., based on an input received from the occupancy sensor). For example, process 1000 may involve deactivating all indicator lights in response to an indication that a building space is no longer occupied. In this regard, activation of indicator lights may be restored in response to an indication that the building space is occupied and/or a user input (e.g., activating a light and/or brightness that was previously deactivated in response to the predetermined event). In some embodiments, the process 1000 further includes the control circuit setting a timer configured to automatically deactivate each of the indicator lights after a predetermined time. The timer may be started or restarted in response to a user input (e.g., pressing one of the buttons 704) or any other input condition.

Referring now to FIG. 11, a process 1100 for optimal representation of setpoint selection is shown according to some embodiments. In some embodiments, the process 1100 is performed by a building device configured to control a temperature setpoint of a building space. For example, one or more steps of the process may be performed by a control circuit of the sensor device 700.

At step 1102, input information is received. In some embodiments, the input information includes a temperature range and default setpoint values as described with reference to FIG. 10. In some embodiments, the input information includes a user input (e.g., received via the buttons 704). The user input may relate to a temperature adjustment to a new setpoint as described herein. In some embodiments, the input information includes a sensor input as described herein. For example, the received information may include an indication that a building is no longer occupied.

At step 1104, a new set point is determined. The new setpoint may be determined based on the user input described above with reference to step 1102. The new setpoint may be determined by associating each instance of pushing one of the buttons 704 with one or more steps as described herein. For example, a thermostat may be provided with a set of six indicator lights that may be either on (activated) or off (deactivated) as illustrated by the user interface 702. Each step may be mapped to one of a plurality of consecutive temperature intervals or values within a temperature range as described with reference to process 1000 and described herein. Accordingly, a new setpoint may be determined based on a user input indicating an increase or decrease to a step.

At step 1106, a visual representation of the setpoint is updated. In some embodiments, the visual representation of the setpoint is updated as described with reference to process 1000. For example, when a temperature selection corresponds to an additional step above the default setpoint, one or more of the indicator lights 722, 724, 726 is activated and/or a brightness is adjusted as described herein. Similarly, when a temperature selection corresponds to an additional step below the default setpoint, one or more indicator lights of the indicator lights 712, 714, or 716 is activated and/or a brightness is adjusted.

In some embodiments, the first subset may be configured with a different color output relative to the second subset. For example, each of the indicator lights 722, 724, 726 may be a red color to visually indicate selection of warmer temperature setpoints, and each of the indicator lights 712, 714, 716 may be a blue color to visually indicate selection of cooler temperature setpoints. In this regard, the indicator light 720 may be configured to provide a white light to visually indicate selection of the default temperature setpoint (e.g., the mid-point between the minimum and maximum temperatures).

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building device comprising:
a plurality of sensors, each of the sensors configured to sense an environmental condition;
a display device having a user interface, the user interface comprising a set of indicator lights and a plurality of touch-sensitive buttons, the touch-sensitive buttons configured to receive a user input; and
a control circuit communicably coupled to the plurality of sensors and the display device, the control circuit configured to:
receive configuration information relating to a preset setpoint value, a maximum setpoint value, and a minimum setpoint value;
store the configuration information in memory;
receive, via the touch-sensitive buttons, a user input relating to a temperature adjustment for increasing a current setpoint value or decreasing the current setpoint value from the preset setpoint value between the minimum setpoint value and the maximum setpoint value;
configure an output of the set of indicator lights to provide a visual representation of the temperature adjustment, according to the temperature adjustment and a step size corresponding to an indicator light of the set of indicator lights, the step size being based on a difference between the maximum setpoint value and the minimum setpoint value;
wherein configuring the output of the set of indicator lights to provide the visual representation of the temperature adjustment comprises associating the current setpoint value with activation or deactivation of at least one of the indicator light of the set.

2. The building device of claim 1, wherein the plurality of sensors comprises a temperature sensor configured to measure an ambient temperature value.

3. The building device of claim 1, wherein the touch-sensitive buttons comprise an increase button and a decrease button, wherein the increase button corresponds to increasing the current setpoint value and the decrease button corresponds to decreasing the current setpoint value.

4. The building device of claim 3, wherein the set of indicator lights comprises a first subset of indicator lights, a second subset of indicator lights, and a mid-point indicator light, wherein the first subset of indicator lights is positioned on one side of the mid-point indicator light and the second subset of indicator lights is positioned on an other side of the mid-point indicator light.

5. The building device of claim 4, wherein the control circuit is configured to:
in response to the current setpoint value being equal to the maximum setpoint value, activate each of the first subset of indicator lights and deactivate each of the second subset of indicator lights and the mid-point indicator light;
in response to the current setpoint value being equal to the minimum setpoint value, deactivate each of the first subset of indicator lights and activate each of the second subset of indicator lights and the mid-point indicator light; and
in response to the current setpoint value being equal to a median setpoint value, activate the mid-point indicator light, deactivate each of the first subset of indicator lights, and deactivate each of the second subset of indicator lights.

6. The building device of claim 5, wherein the control circuit is configured to determine the step size according to the number of indicator lights and the difference between the maximum setpoint value and the minimum setpoint value, wherein, to determine the step size, the control circuit is configured to:

determine a number of steps, the number of steps equal to the number of indicator lights;

associate each step with a temperature interval of a set of consecutive temperature intervals of an adjustment range, the adjustment range defined by the difference between the maximum setpoint value and the minimum setpoint value, wherein each of the temperature intervals relates to a current setpoint value above the preset setpoint value or to a current setpoint value below the preset setpoint value;

determine a first set of permutations, each of the permutations in the first set corresponding to the visual representation of the temperature adjustment, wherein the first set of permutations is based on each indicator light being activated or deactivated; and associate each of the steps with a permutation of the set;

wherein the control circuit is further configured to configure, in response to a user input relating to the temperature adjustment, the set of indicator lights according to one of the permutations.

7. The building device of claim 6, wherein each indicator light is configured to provide a plurality of brightness levels, and the control circuit is configured to:

determine the number of steps as equal to the number of indicator lights multiplied by the number of brightness levels;

determine a second set of permutations, each of the permutations in the second set corresponding to the visual representation of the temperature adjustment, wherein the second set of permutations is based on each indicator light being activated or deactivated and on a brightness level;

associate each of the steps with a permutation of the second set; and in response to a user input relating to the temperature adjustment, configuring the set of indicator lights according to one of the permutations.

8. The building device of claim 4, wherein each of the first subset of indicator lights is provided as a red color and each of the second subset of indicator lights is provided as a blue color.

9. The building device of claim 4, wherein the first subset of indicator lights comprises three indicator lights and the second subset of indicator lights comprises three indicator lights.

10. The building device of claim 1, wherein the control circuit is communicably and operatively coupled to an HVAC device configured to change an ambient temperature, wherein the control circuit is configured to operate the HVAC device in response to receiving a user input relating to the temperature adjustment.

11. The building device of claim 1, wherein the preset setpoint value comprises a preset temperature value.

12. A sensor device for use in a room, comprising:

a temperature sensor configured to sense temperature in the room;

a humidity sensor configured to sense humidity in the room;

a carbon dioxide sensor configured to sense a carbon dioxide level in the room;

an occupancy sensor configured to detect the presence of a person in the room; and a display device having a user interface, the user interface comprising a set of indicator lights and a plurality of touch-sensitive buttons, the touch-sensitive buttons configured to receive a user input, the display device comprising a control circuit configured to:

receive configuration information relating to a preset setpoint value, a maximum setpoint value, and a minimum setpoint value, store the configuration information in memory, receive, via the touch-sensitive buttons, a user input relating to a temperature adjustment for increasing a current setpoint value or decreasing the current setpoint value from the preset setpoint value between the minimum setpoint value and the maximum setpoint value, configure an output of the set of indicator lights to provide a visual representation of the temperature adjustment, according to the temperature adjustment and a step size corresponding to an indicator light of the set of indicator lights, the step size being based on a difference between the maximum setpoint value and the minimum setpoint value, wherein configuring the output of the set of indicator lights to provide the visual representation of the temperature adjustment comprises associating the current setpoint value with activation or deactivation of at least one of the indicator light of the set.

13. The sensor device of claim 12, wherein the touch-sensitive buttons comprise an increase button and a decrease button, wherein the increase button corresponds to increasing the current setpoint value and the decrease button corresponds to decreasing the current setpoint value.

14. The sensor device of claim 13, wherein the set of indicator lights comprises a first subset of indicator lights, a second subset of indicator lights, and a mid-point indicator light, wherein the first subset of indicator lights is positioned above the mid-point indicator light and the second subset of indicator lights is positioned below the mid-point indicator light.

15. The sensor device of claim 14, wherein the control circuit is configured to:

in response to the current setpoint value being equal to the maximum setpoint value, activate each of the first subset of indicator lights and deactivate each of the second subset of indicator lights and the mid-point indicator light;

in response to the current setpoint value being equal to the minimum setpoint value, deactivate each of the first subset of indicator lights and activate each of the second subset of indicator lights and the mid-point indicator light; and in response to the current setpoint value being equal to a median setpoint value, activate the mid-point indicator light, deactivate each of the first subset of indicator lights, and deactivate each of the second subset of indicator lights.

16. The sensor device of claim 15, wherein the control circuit is configured to determine the step size according to the number of indicator lights and the difference between the maximum setpoint value and the minimum setpoint value, wherein, to determine the step size, the control circuit is configured to:

determine a number of steps, the number of steps equal to the number of indicator lights;

associate each step with a temperature interval of a set of consecutive temperature intervals of an adjustment range, the adjustment range defined by the difference between the maximum setpoint value and the minimum setpoint value, wherein each of the temperature intervals relates to a current setpoint value above the preset setpoint value or to a current setpoint value below the preset setpoint value;

determine a first set of permutations, each of the permutations in the first set corresponding to the visual representation of the temperature adjustment, wherein the first set of permutations is based on each indicator light being activated or deactivated; and associate each of the steps with a permutation of the first set;

wherein the control circuit is further configured to configure, in response to a user input relating to a temperature adjustment, the first set of indicator lights according to one of the permutations.

17. The sensor device of claim 16, wherein the control circuit is configured to:

determine the number of steps as equal to the number of indicator lights multiplied by the number of brightness levels;

determine a second set of permutations, each of the permutations in the second set corresponding to the visual representation of the temperature adjustment, wherein the second set of permutations is based on each indicator light being activated or deactivated and on a brightness level;

associate each of the steps with a permutation of the second set; and in response to a user input relating to a temperature adjustment, configuring the set of indicator lights according to one of the permutations in the second set.

18. The sensor device of claim 14, wherein each of the first subset of indicator lights is provided as a red color and each of the second subset of indicator lights is provided as a blue color.

19. The sensor device of claim 18, wherein the mid-point indicator light is provided as a white color.

20. The sensor device of claim 14, wherein the first subset of indicator lights comprises three indicator lights and the second subset of indicator lights comprises three indicator lights.

21. The sensor device of claim 12, wherein the control circuit is communicably and operatively coupled to an HVAC device configured to change an ambient temperature, wherein the control circuit is configured to operate the HVAC device in response to receiving a user input relating to a temperature adjustment.

* * * * *